US009473659B2

(12) United States Patent
Matsumoto (10) Patent No.: US 9,473,659 B2
(45) Date of Patent: Oct. 18, 2016

(54) BLANK SKIP ACTION IN AN IMAGE FORMING APPARATUS

(71) Applicant: Hiroshi Matsumoto, Kanagawa (JP)

(72) Inventor: Hiroshi Matsumoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/092,884

(22) Filed: Nov. 27, 2013

(65) Prior Publication Data

US 2014/0153021 A1   Jun. 5, 2014

(30) Foreign Application Priority Data

Dec. 4, 2012   (JP) ................. 2012-265526

(51) Int. Cl.
| H04N 1/00 | (2006.01) |
| H04N 1/17 | (2006.01) |
| H04N 1/23 | (2006.01) |
| G06K 15/10 | (2006.01) |
| H04N 1/191 | (2006.01) |

(52) U.S. Cl.
CPC .......... *H04N 1/00912* (2013.01); *G06K 15/10* (2013.01); *H04N 1/00278* (2013.01); *H04N 1/17* (2013.01); *H04N 1/233* (2013.01); *H04N 1/2369* (2013.01); *H04N 1/1911* (2013.01)

(58) Field of Classification Search
CPC ........... B41J 11/42; B41J 19/76; H04N 1/17; H04N 1/23; H04N 1/409
USPC ....................................... 358/1.13
See application file for complete search history.

(56) References Cited

U.S. PATENT DOCUMENTS

| 3,676,856 | A | * | 7/1972 | Manly | ......... B41J 5/32 715/209 |
| 4,709,149 | A | * | 11/1987 | Takahashi | ............ H04N 1/1008 250/317.1 |
| 4,768,164 | A | * | 8/1988 | Dreher | ........ B41J 5/44 358/1.13 |
| 5,374,998 | A | * | 12/1994 | Iida | .......... H04N 1/17 358/409 |
| 5,680,521 | A | * | 10/1997 | Pardo | ...... G06K 15/00 358/1.13 |
| 5,689,294 | A | * | 11/1997 | Karz | ........ B41J 29/18 347/14 |
| 5,717,840 | A | * | 2/1998 | Pardo | ...... G06K 15/00 358/1.13 |
| 6,501,556 | B1 | * | 12/2002 | Nishii | .... G06K 15/02 358/1.12 |

(Continued)

FOREIGN PATENT DOCUMENTS

| JP | 2010-023461 | | 2/2010 |
| JP | 2010023461 | A * | 2/2010 |

*Primary Examiner* — Tammy Pham
*Assistant Examiner* — Edwin S Leland, III
(74) *Attorney, Agent, or Firm* — Duft Bornsen & Fettig LLP (57) ABSTRACT

An image forming apparatus divides image data into a plurality of image regions in a sub-scanning direction and performs predetermined processing on the image data of each divided image region so as to form an image on a recording medium. The image forming apparatus includes: a detection unit that detects whether the image data of the image region is blank data; a storage unit that stores the image data of the image region that has been subjected to detection; and a control unit that controls whether to cause the detection unit to perform the detection depending on a predetermined printing mode.

5 Claims, 10 Drawing Sheets

(56) References Cited

U.S. PATENT DOCUMENTS

| | | | | |
|---|---|---|---|---|
| 6,824,239 | B1* | 11/2004 | Hanabusa | B41J 2/5056 347/15 |
| 8,432,566 | B2* | 4/2013 | Adachi | G06F 3/1208 347/104 |
| 8,576,421 | B2* | 11/2013 | Nomura | B41J 13/0009 358/1.12 |
| 2002/0122198 | A1* | 9/2002 | Tsue | G06T 3/40 358/1.13 |
| 2002/0164185 | A1* | 11/2002 | Horiuchi | B41J 11/42 400/76 |
| 2006/0061833 | A1* | 3/2006 | Kikuchi | H04N 1/00405 358/474 |
| 2006/0285163 | A1* | 12/2006 | Han | G06F 17/2294 358/1.18 |
| 2008/0077793 | A1* | 3/2008 | Tan | G06F 21/56 713/168 |
| 2010/0053682 | A1* | 3/2010 | Gotoh | H04N 1/00411 358/1.15 |
| 2011/0037990 | A1* | 2/2011 | Unno | G03G 15/50 358/1.5 |
| 2011/0109682 | A1* | 5/2011 | Kitai | B41J 11/002 347/16 |
| 2011/0267396 | A1* | 11/2011 | Yamamoto | B41J 3/60 347/16 |
| 2011/0293345 | A1* | 12/2011 | Mastie | B41J 11/46 400/76 |
| 2011/0304879 | A1* | 12/2011 | Kakutani | G03G 21/046 358/1.15 |
| 2012/0120432 | A1* | 5/2012 | Hirohata | H04N 1/00474 358/1.13 |
| 2012/0154853 | A1* | 6/2012 | Otake | H04N 1/41 358/1.15 |
| 2012/0176637 | A1* | 7/2012 | Miyahara | H04N 1/00846 358/1.13 |
| 2012/0176644 | A1* | 7/2012 | Takeuchi | B41J 29/38 358/1.15 |
| 2012/0213569 | A1* | 8/2012 | Kuno | B41J 19/147 400/76 |
| 2014/0010467 | A1* | 1/2014 | Mochizuki | H04N 19/176 382/232 |
| 2014/0152753 | A1* | 6/2014 | Moriyama | B41J 11/009 347/110 |

* cited by examiner

BLANK SKIP ACTION IN AN IMAGE FORMING APPARATUS

CROSS-REFERENCE TO RELATED APPLICATIONS

The present application claims priority to and incorporates by reference the entire contents of Japanese Patent Application No. 2012-265526 filed in Japan on Dec. 4, 2012.

BACKGROUND OF THE INVENTION

1. Field of the Invention

The present invention relates to an image forming apparatus with copy and printer functions which includes an ink jet recording head.

2. Description of the Related Art

To achieve high-speed printing, when a blank image with a width equal to or greater than the recording head width (hereafter referred to as one band) is included in a recording image, image forming apparatuses with an ink jet recording head skip over the blank part, in the case of which only the conveyance of sheet is done without forming the image by scanning of the recording head at the blank part (for example, see Japanese Patent Application Laid-Open No. 2010-23461).

The blank skip function is a function peculiar to the ink jet image forming apparatus and employs different control methods depending on a model-specific configuration such as the width or the arrangement of the recording head. Thus, the blank skip function is preferably provided not in the controller control unit but in the engine control unit serving as a printing control unit.

However, the blank skip function in the engine control unit cannot reduce the printing time of a recording image in which no blank skip occurs. That is, the blank skip function in the engine control unit detects whether image data of one band is blank and then switches whether to perform a blank skip on the basis of the detection result. At this time, when no blank band exists in the image data, there occurs a delay in the printing by the time for detecting whether there is a blank.

In view of the aforementioned, there is a need to provide an image forming apparatus and an image forming method that provides reduced printing time in a printing mode in which there is a high probability of no blank band existing in image data.

SUMMARY OF THE INVENTION

It is an object of the present invention to at least partially solve the problems in the conventional technology.

An image forming apparatus divides image data into a plurality of image regions in a sub-scanning direction and performs predetermined processing on the image data of each divided image region so as to form an image on a recording medium. The image forming apparatus includes: a detection unit that detects whether the image data of the image region is blank data; a storage unit that stores the image data of the image region that has been subjected to detection; and a control unit that controls whether to cause the detection unit to perform the detection depending on a predetermined printing mode.

An image forming method divides image data into a plurality of image regions in a sub-scanning direction and performs predetermined processing on the image data of each divided image region so as to form an image on a recording medium. The image forming method includes: a detection step of detecting whether the image data of the image region is blank data; a storing step of storing the image data of the image region that has been subjected to detection; and a control step of controlling whether to execute the detection step depending on a predetermined printing mode.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Now, the invention will be described in more detail in accordance with an embodiment with reference to the drawings. The blank skip function is turned ON in a printer mode, while the blank skip function is turned OFF in a copy mode, whereby while the printing time in the printer mode is kept unchanged, the printing time is reduced in the copy mode in which there is a low possibility that a blank band is included.

First Example

Figure 1:
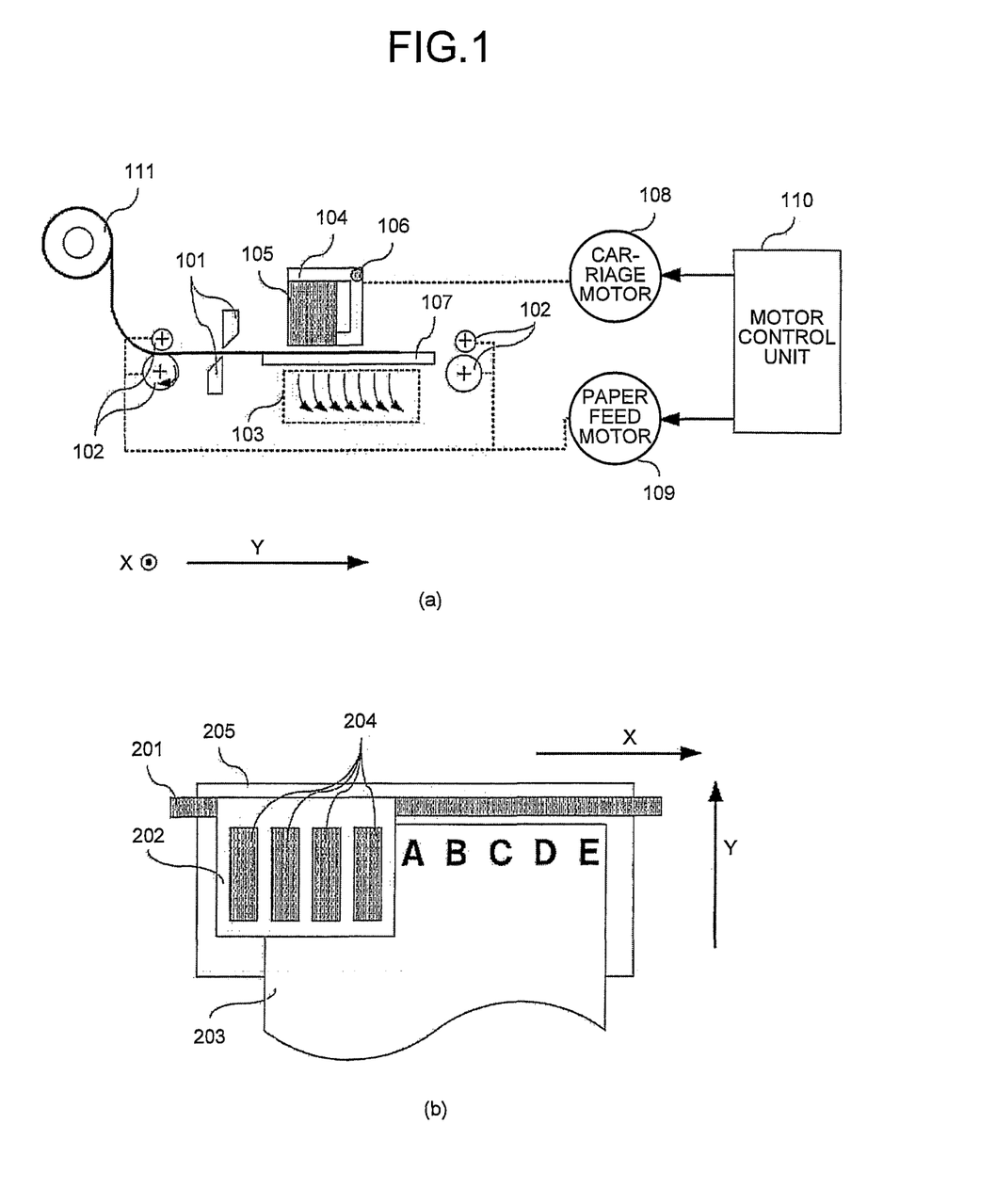
FIG. 1 illustrates an image forming apparatus, with an ink jet recording head, to which the present invention is applied.

FIG. 1(a) illustrates an image forming apparatus with an ink jet recording head to which the present invention is applied. A recording sheet (recording medium) 111 is a cylinder of paper wound in a roll shape and conveyed in a sub-scanning direction (Y direction) by conveying rollers 102. The conveying rollers 102 are rotated by a paper feed motor 109, which is controlled by a motor control unit 110. The recording sheet 111 being conveyed is supported by a platen 107. An air suction unit 103 is provided under the platen 107. The air suction unit 103 draws air through air holes formed through the platen 107 and thereby allows the recording sheet 111 to be conveyed on the platen without being bent.

When the recording sheet 111 is conveyed by a certain amount, a carriage 104 supporting a recording head 105 performs scanning in a main-scanning direction (X direction). The carriage 104 is supported by a guide rod 106 and driven in the main-scanning direction by a carriage motor 108. The carriage motor 108 is controlled by the motor control unit 110. While the carriage 104 is scanning in the main-scanning direction, an ink(s) is(are) ejected from a plurality of nozzles provided in the recording head 105 so as to record images on the recording sheet 111. Conveyance of The recording sheet 111 and scanning by the carriage 104 as described above are repeated as so as to record an image.

When data to be recorded on the recording sheet 111 run out, the image recording operation is completed. Then, the recording sheet 111 is cut with a cutter 101 and ejected by the conveying roller 102.

FIG. 1(b) is an explanatory view illustrating the recording operation of the image forming apparatus. A carriage 202 is supported by the guide rod 201. A plurality of recording heads 204 discharge minute ink droplets onto a recording sheet 203 while the carriage 202 is travelling in the main-scanning direction (the X direction), thereby recording an image (hereafter referred to as scanning). The recording sheet 203 is supported by a platen 205 and conveyed in a sub-scanning direction (the Y direction) at the start of the recording operation.

Conveyance of the recording sheet 203 and travelling of the carriage 202 are repeated to thereby implement the recording operation. When data to be recorded onto the recording sheet 203 run out, the recording operation is completed and the recording sheet 203 is ejected.

Figure 2:
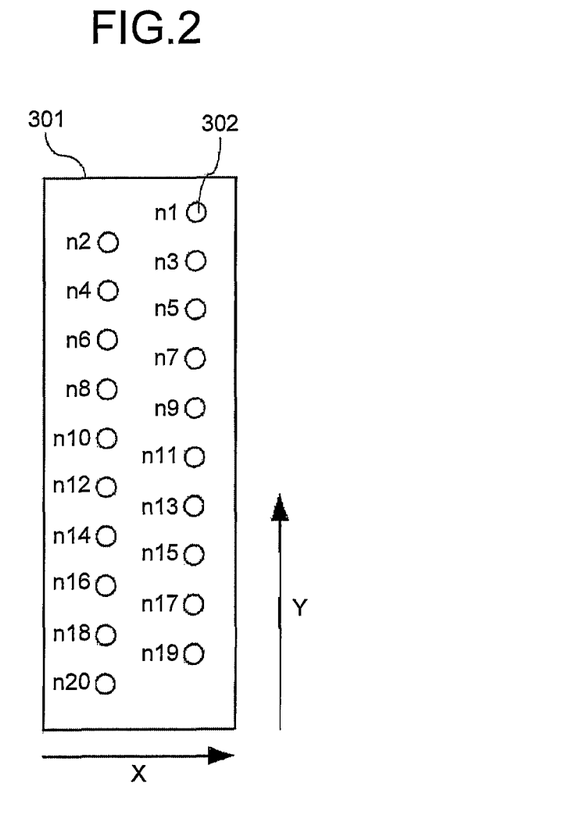
FIG. 2 illustrates the configuration of the recording head.

FIG. 2 shows the configuration of the recording head. The recording head 301 has a plurality of nozzles 302, which are arranged in a direction (the Y direction) perpendicular to the travel direction (the X direction) of the carriage so as to form nozzle arrays.

The nozzle array made up of n1, n3, n5, . . . , and n19 and the nozzle array made up of n2, n4, n6, . . . , and n20 can discharge the same color ink or different color inks. The ink(s) is(are) discharged from each nozzle array of each of the plurality of recording heads disposed in the carriage 202 shown in FIG. 1(b), thereby forming an image on the recording medium.

Figure 3:
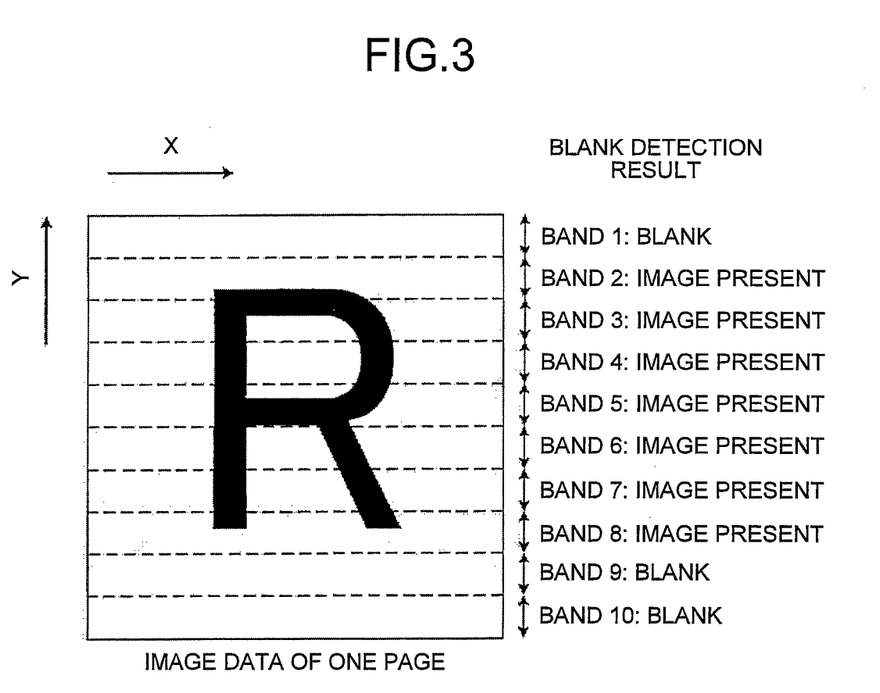
FIG. 3 is a view explaining a blank skip action.

FIG. 3 is a view illustrating a blank skip action. It is detected whether there is blank data in image data of one page in units of the sub-scanning width of the recording head 301 consisting of a plurality of lines. Image data corresponding to the sub-scanning width of the recording head 301 is referred to as a band. In FIG. 3, image data of one page is divided into ten bands (image regions).

In a blank skip, scanning by the carriage 202 is not performed for a band containing only blank data, but the image formation is replaced by conveyance of the amount of the sheet corresponding to the band, thereby reducing the time for forming an image.

Figure 4:
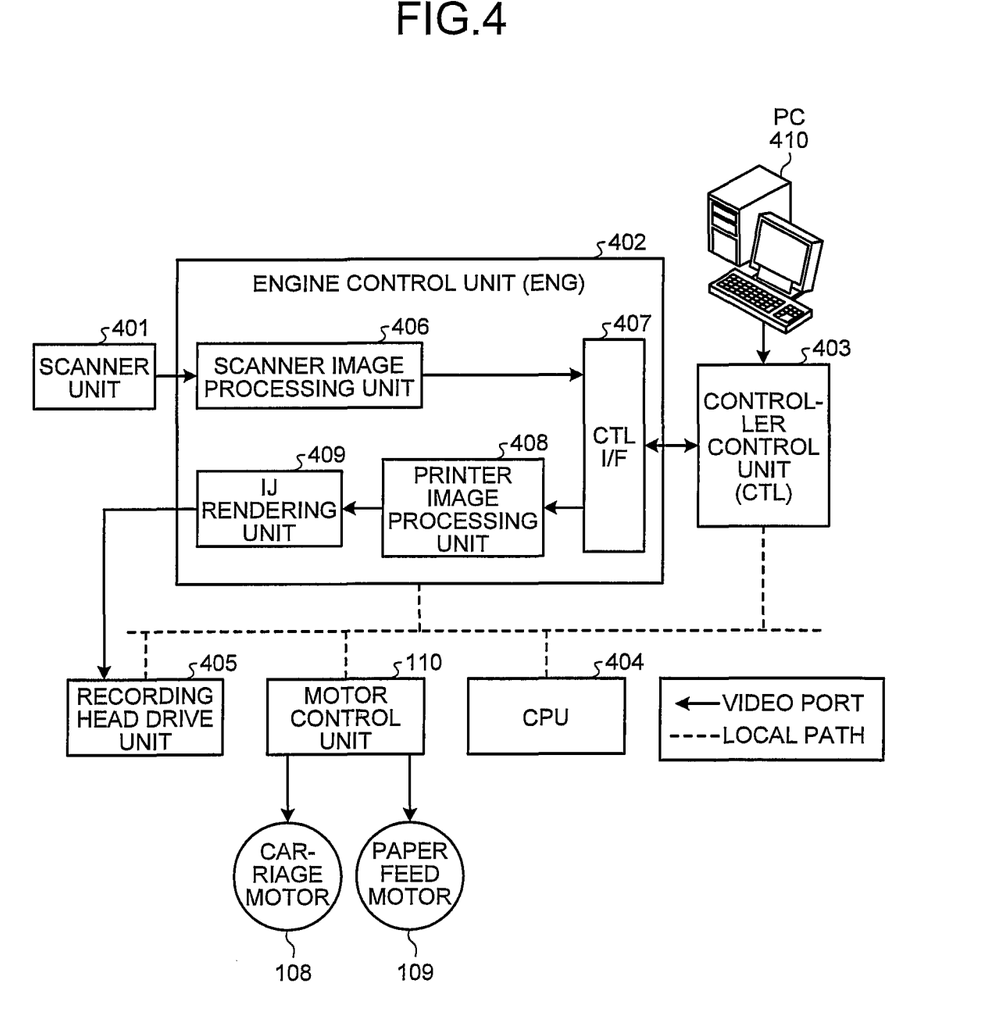
FIG. 4 illustrates the system configuration of the image forming apparatus of the present invention.

FIG. 4 illustrates the system configuration of the image forming apparatus of the present invention. The image forming apparatus is made up of a scanner unit 401 for reading a document image, an engine control unit 402 for controlling printing of images, a controller control unit 403 for controlling the entire system, a CPU 404 for controlling each component, a recording head drive unit 405 for controlling the driving of the recording head, and the motor control unit 110 for controlling the carriage motor 108 and the paper feed motor 109.

The scanner unit 401 has a function of reading the document, converting the document into image data, and forwarding the image data to the engine control unit 402. The engine control unit 402 is made up of a scanner image processing unit 406 for processing the image data forwarded from the scanner unit 401, a controller (CTL) I/F 407 for communicating with the controller control unit 403, a printer image processing unit 408 for processing the image data supplied from the controller I/F 407, and an IJ rendering unit 409 for conversion of the image data according to the arrangement of the recording head.

The controller control unit 403 accumulates an image supplied from the engine control unit 402 or an image supplied from an external PC 410 and follows a command from the external PC 410 to forward a print image to the engine control unit 402. The motor control unit 110 has a function of controlling the carriage motor 108 so as to cause the carriage to perform scanning in the main-scanning direction and a function of controlling the paper feed motor 109 to convey the recording sheet in the sub-scanning direction. The recording head drive unit 405 records the image data supplied from the engine control unit 402 onto the recording sheet by discharging ink from the recording head. The CPU 404 controls each of these components.

During copy printing, an image is forwarded from the scanner unit 401 through the engine control unit 402, the controller control unit 403, and the engine control unit 402 to the recording head drive unit 405 sequentially in that order. During printer printing, an image is forwarded from the external PC 410 through the controller control unit 403, and the engine control unit 402 to the recording head drive unit 405 sequentially in that order.

Furthermore, an image to be forwarded from the controller control unit 403 to the engine control unit 402 is sequentially supplied pixel by pixel from the top pixel of the recording image in the main-scanning and sub-scanning directions and line by line in the main-scanning direction, and then the next line is supplied in the same order from the top in the main-scanning direction. Taking FIG. 3 as an example, the pixels are supplied pixel by pixel from the upper left one in the main-scanning direction and line by line, and then the next line is supplied sequentially in the same order from the left. An image to be supplied to the printer image processing unit 408 via the CTL I/F 407 is also supplied in the same forwarding sequential order.

Figure 5:
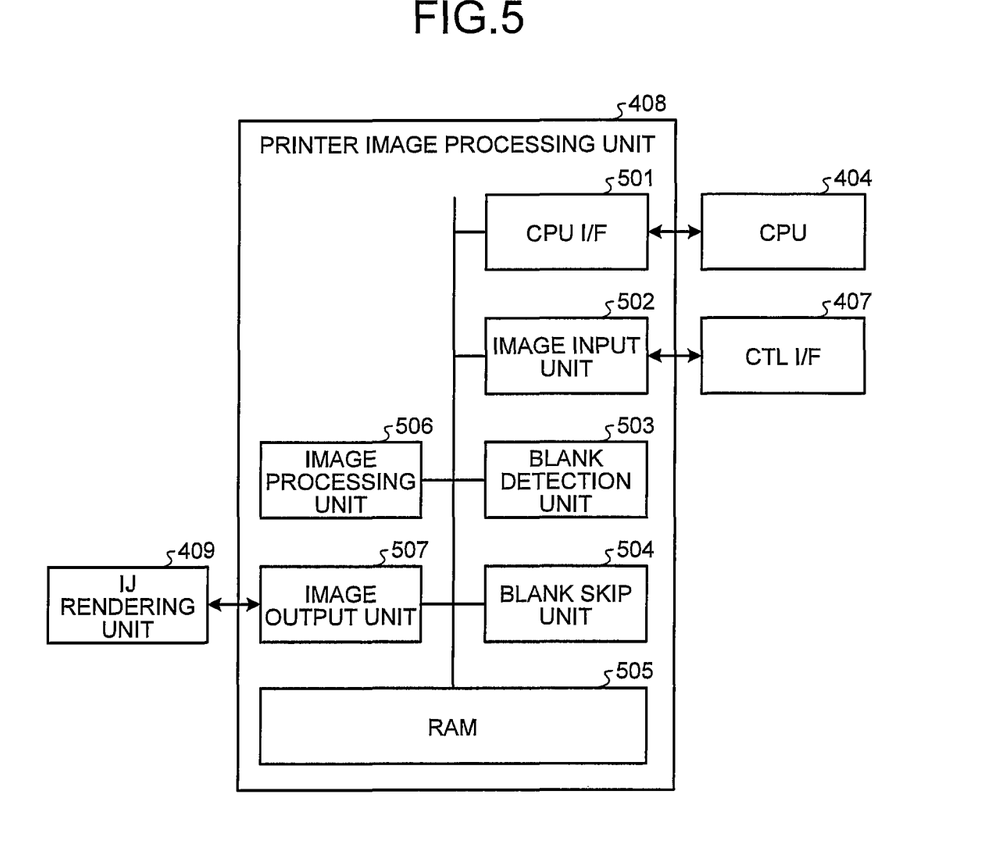
FIG. 5 illustrates the configuration of a printer image processing unit.

FIG. 5 illustrates the configuration of the printer image processing unit that executes the blank skip function. The blank skip function is achieved by the printer image processing unit 408 and the CPU 404. The printer image processing unit 408 receives, via a CPU I/F 501, the size of the image data to be processed, image processing parameters, and other control information as well as receives various types of information that is informed by the printer image processing unit 408. An image input unit 502 receives image data forwarded from the CTL I/F 407.

A blank detection unit 503 sequentially detects line by line whether the received band image data is blank data, and then stores the image data on a RAM 505 serving as a unit for storing image data. When the detection of a blank of one band is completed, the blank detection unit 503 informs the CPU 404 via the CPU I/F 501 of the detection result that the band is blank or has an image, and then detects whether the image data of the next band is blank data. It is enough that the RAM 505 has a region that can store the received image of one band or greater. A region for two bands may be provided so as to receive and forward the image by switching between the bands.

Furthermore, the blank detection unit 503 manages free space of the RAM 505 available for storage, so that when no free space is available, the blank detection unit 503 informs the image input unit 502 thereof and the image input unit 502 temporarily stops receiving and forwarding the image from and to the CTL I/F 407.

Upon reception of the detection result, the CPU 404 follows the detection result so as to select via the CPU I/F 501 whether to skip or not to skip a blank. When selecting to skip a blank, the CPU 404 informs a blank skip unit 504 of skipping and performs various types of control to replace printing of that band with a sheet feed. When selecting not to skip a blank, the CPU 404 informs the blank skip unit 504 of not skipping and performs various types of control to print that band. Note that the control for replacing with a sheet feed and the control for printing will not be detailed here.

The blank skip unit 504 performs processing in accordance with the notice of skipping or not skipping a blank from the CPU 404. When informed of skipping a blank, the blank skip unit 504 discards the received image data of that band recorded in the RAM 505. When informed of not skipping a blank, the blank skip unit 504 reads the received image data of that band recorded in the RAM 505 pixel by pixel from the top pixel of the recording image in the main-scanning and sub-scanning directions, in the main-scanning direction and line by line, and then passes the image data to an image processing unit 506.

The image processing unit 506 sequentially performs image data conversion processing, such as conversion of resolution, gamma correction, or correction of character edges on the received image data pixel by pixel line by line in conformity with the characteristics of the engine; and converts the image data to data of small value (the number of gradation equivalent to the number of the types of droplets to be discharged). The image processing unit 506 passes the image-processed data to an image output unit 507. The image output unit 507 outputs the image to the IJ rendering unit 409.

The IJ rendering unit 409 performs conversion of the image in accordance with the recording head configuration and the printing mode set by the CPU 404 so as to provide the image data in units of an image output by one head scan, and outputs the resulting image data to the recording head drive unit 405.

Figure 6:
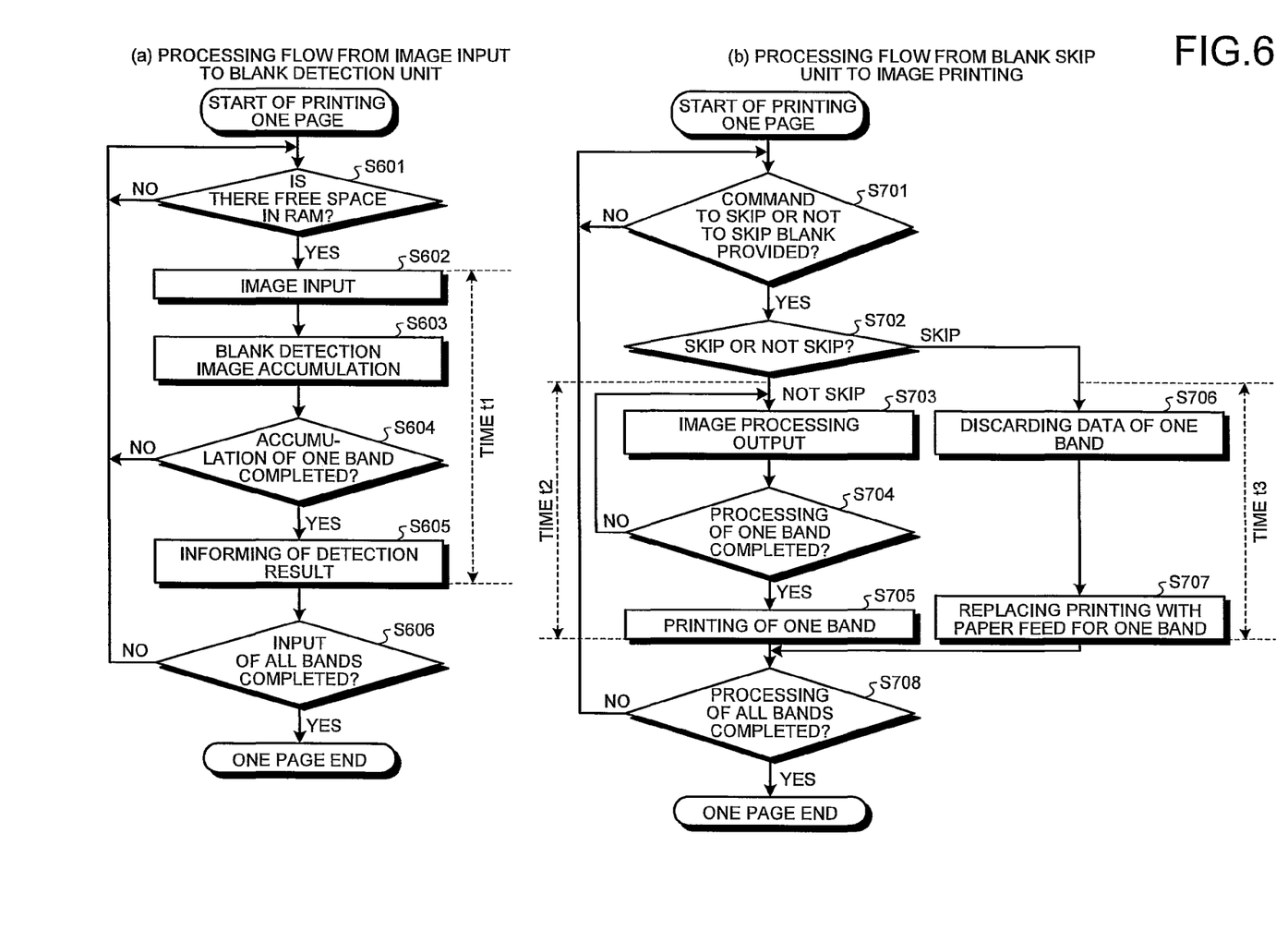
FIG. 6 shows processing flowcharts of conventional image printing.

FIG. 6 illustrates a processing flowchart of conventional image printing. FIG. 6(a) illustrates a processing flowchart from the processing of the image input unit 502 in the printer image processing unit 408 to the processing of the blank detection unit 503. Furthermore, FIG. 6(b) illustrates the processing flow from the processing of the blank skip unit 504 in the printer image processing unit 408 up to image recording. The processing flowcharts of FIGS. 6(a) and (b) are executed in parallel.

In FIG. 6(a), when printing of one page is started, the blank detection unit 503 checks whether recordable free space is available on the RAM 505 (S601). If no free space is available, the check is repeated until free space becomes available.

If free space is available, the image input unit 502 receives an image (S602). The blank detection unit 503 detects on the received image data whether the image data of a band is blank, and then accumulates the image data of the band that has been subjected to the detection, in the RAM 505 (S603). The blank detection unit 503 determines whether image accumulation of one band has been completed (S604).

If image accumulation of one band has not been completed (NO in S604), the process proceeds to S602 to receive an image, detect a blank and accumulates the image again. If image accumulation of one band has been completed, the blank detection unit 503 informs the CPU 404 of the detection result (S605). The process determines whether image accumulation of all band data in one page have been completed (S606). If not completed (NO in S606), the process proceeds to S601 to repeat the processing in the same manner on the next band, and if completed (YES in S606), then the processing of one page is completed.

In FIG. 6(b), when printing of one page is started, the blank skip unit 504 checks whether a command to perform blank skip or a command not to perform blank skip has been received or not for the current band from the CPU 404 (S701). The command to skip or not to skip a blank is provided after an image of one band has been accumulated (S604) in FIG. 6(a), so that the process waits until image accumulation of one band is completed.

If no command has been provided, the process is repeated until the command is provided. If the command has been provided, the blank skip unit 504 checks whether it is commanded to skip or not to skip (S702). If it is commanded not to skip, the blank skip unit 504 forwards the image data on the RAM 505 pixel by pixel from the top pixel of the recording image in the main-scanning and sub-scanning directions, in the main-scanning direction and line by line, and the image processing unit 506 sequentially processes the image data pixel by pixel and line by line, and the image output unit 507 outputs the resulting image data (S703).

The image output unit 507 checks whether output of one band has been completed (S704). If output of one band has not been completed (NO in S704), the process proceeds to S703 to repeatedly forward image data, process the image, and output the image. If output of one band has been completed (YES in S704), the IJ rendering unit 409 performs conversion of the image and then output to the recording head drive unit 405, so that the recording head drive unit 405 prints the image of one band, while at the same time, the motor control unit 110 causes the recording head to perform scanning in the main-scanning direction to record the image on a recording sheet (S705).

If it is commanded to skip, the blank skip unit 504 discards the image data of one band on the RAM 505 (S706). The CPU 404 provides a command to the motor control unit 110 so as not to print the image of one band but replace the printing with a sheet feed, so that the motor control unit 110 performs control to convey the recording medium by the conveyance amount corresponding to the blank data (S707).

After the image of one band is printed or the printing is replaced by a sheet feed, the process determines whether image accumulation of all band data in one page has been completed (S708). If not completed (NO in S708), the process proceeds to S701 to repeat the processing in the same manner on the next band. If completed (YES in S708), processing of one page is completed. Through the processing of FIGS. 6(a) and (b), the image is printed.

In the processing flowchart of FIG. 6(a), let t1 be the time from the reception of one band image until the result of detection is informed. Furthermore, in the processing flowchart of FIG. 6(b), let t2 be the time from the processing of an image of one band until the resulting image is printed, and let t3 be the time for discarding an image data and feeding a sheet for one band.

The order in magnitude of times t1 to t3 is $t3<t1<t2$. In time t1, the time required to forward an image of one band through the CTL I/F 407 to the printer image processing unit 408 is dominant. In time t2, the time required to print an image of one band, that is, the carriage scanning time and the sheet feed time for one band is dominant, and this varies depending on the printing mode. For example, in the high-speed printing mode, an image of one band is printed by one time of carriage scanning and sheet feed, whereas in the printing mode for printing high-quality images, an image of one band is printed by multiple times of carriage scanning and sheet feed, prolonging time t2. However, even in the high-speed printing mode, it is typically true that time t2 is longer than t1. In time t3, the time for conveying the sheet for one band is dominant, and time t3 is far shorter than time t1 and time t2.

In the processing flowchart of FIG. 6(b), the process checks whether the CPU 404 has commanded to skip or not to skip a blank for the current band (S701). However, at the head of a page, the time for waiting for the command arises until the result of detection in the processing flowchart of FIG. 6(a) is informed (S605). During the time for waiting for the command, the process waits for time t1 from the start of printing.

When no blank skip function is installed, in the processing flowchart of FIG. 6(b), the process does not need to wait for the command to skip or not to skip a blank. That is, the process does not need to wait for the image accumulation of one band by the blank detection unit 503, so that during time t1 otherwise required to wait for the image accumulation when the blank skip function is installed, the image data forwarded from the image input unit 502 can be sequentially forwarded to the image processing unit 506. Thus, the printing time for one page with the blank skip function installed may be longer by time t1 than that with the blank skip function not installed. A longer printing time may be required to print a recording image for which no blank skip occurs.

When a blank skip occurs, time t2 required for printing an image of one band is reduced to t3, so that since t1<t2−t3, the time for printing one page is reduced. For example, a large image forming apparatus configured to perform processing of sheet sizes up to the width of A0 has a time t1 of about 1000 ms, and this is not negligible.

Figure 7:
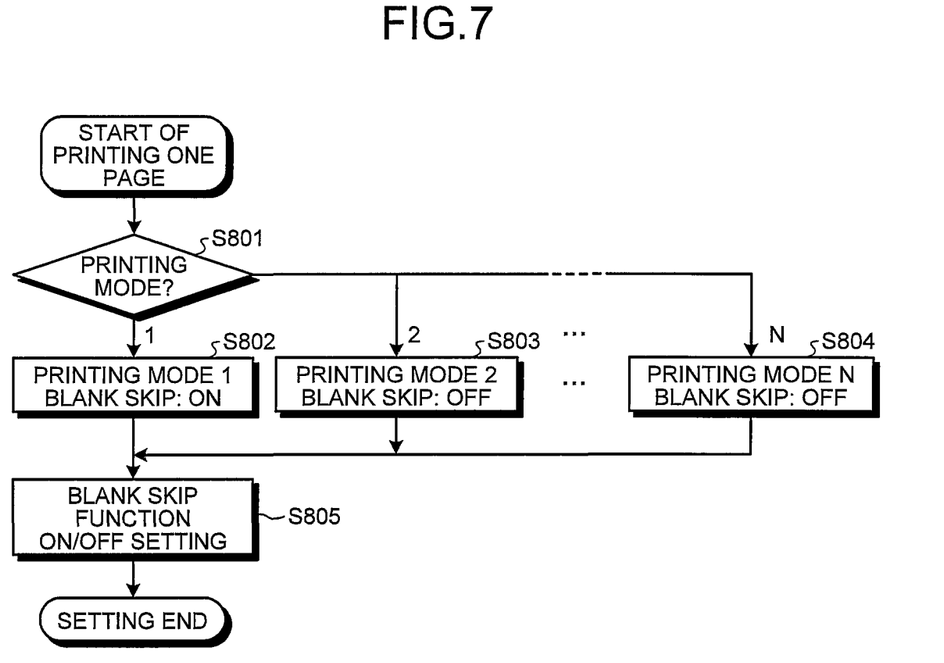
FIG. 7 is a processing flowchart in which OFF/ON of a blank skip function is performed according to the present invention.

FIG. 7 is a processing flowchart for switching between OFF and ON of the blank skip function for each printing mode. In the present invention, the blank skip function can be set to ON or OFF for each printing mode. The setting is held in a record region in the CPU 404.

The CPU 404 determines the printing mode at the start of printing (S801), and sets the ON or OFF of the blank skip function to a record region in the CPU 404 depending on the printing mode (S802, S803, S804) (S805). When the blank skip function is ON, the CPU 404 performs control in accordance with the processing flowchart of FIG. 6 mentioned above, whereas when the blank skip function is OFF, the CPU 404 does not give blank detection notice and a command to skip or not to skip. Note that the ON/OFF setting of a blank skip can be switched by the user.

In practice, once the printing mode is determined, the CPU 404 determines how many lines are to be included in one band. The CPU 404 specifies the number of lines to the engine control unit 402, and at the time of output, the engine control unit 402 performs control to the entire engine control unit 402 so as to proceed to the next processing for each of the number of lines. The engine control unit 402 performs processing for each of the predetermined number of lines, with the result that an image of one page is divided into predetermined image regions and processed.

Figure 8:
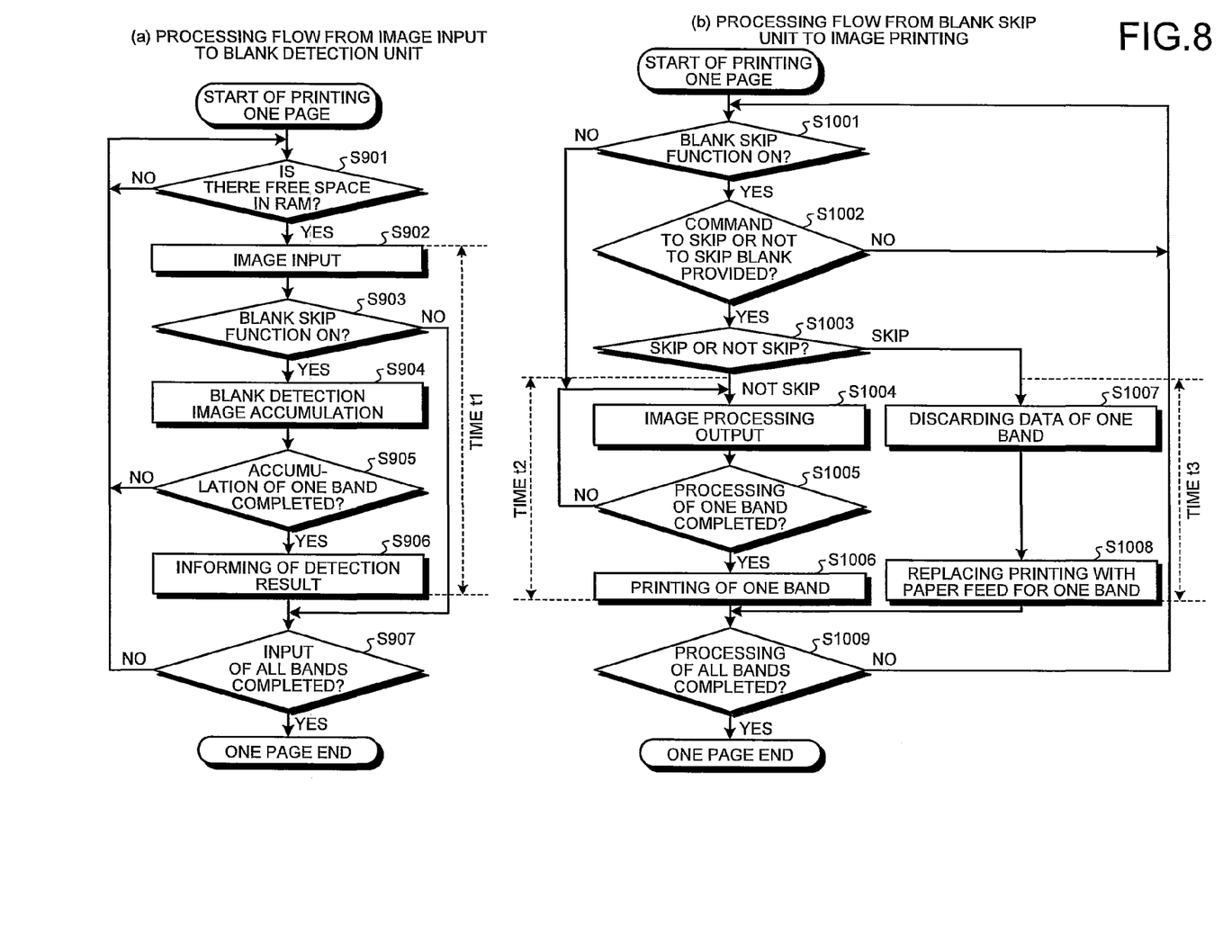
FIG. 8 shows a processing flowchart of image printing according to the present invention.

FIG. 8 is a processing flowchart for printing an image according to the present invention. In FIG. 8(a), as the processing of the blank detection unit 503 in the printer image processing unit 408, processing of determining whether the blank skip function is ON (S903) is added compared with the processing flowchart of FIG. 6(a). When the blank skip function is ON, the same processing as in the processing flowchart as that of FIG. 6(a) is performed. When the blank skip function is OFF, the blank detection unit 503 does not perform blank detection and image accumulation, but passes image data to the blank skip unit 504.

In FIG. 8(b), as the processing of the blank skip unit 504 in the printer image processing unit 408, the processing of determining whether the blank skip function is ON (S1001) is added compared with the processing flowchart of FIG. 6(b). When the blank skip function is ON, the same processing as in the processing flowchart as that of FIG. 6(b) is performed. When the blank skip function is OFF, the blank skip unit 504 does not perform determination of whether a command to perform blank skip or a command not to perform blank skip has been received or not and determination regarding the command, but performs the same processing on the image data supplied by the blank detection unit 503 as in the case where it is commanded not to perform blank skip in FIG. 6(b).

That is, when the blank skip function is OFF, the process does not need to wait for the image accumulation of one band by the blank detection unit 503, so that during time t1 otherwise required to wait for the image accumulation when the blank skip function is ON, the image data forwarded from the image input unit 502 can be sequentially forwarded to the image processing unit 506.

As described above, when the blank skip function is OFF, time t1 is reduced to a negligible level, and, at the same time as that image transfer of one line is completed, the processing of FIG. 8(b) can be started without a delay corresponding to one band with respect to FIG. 8(a). Thus, even when the blank skip function is installed, the time for printing one page is not prolonged compared with the case where the blank skip function is not installed.

Figure 9:
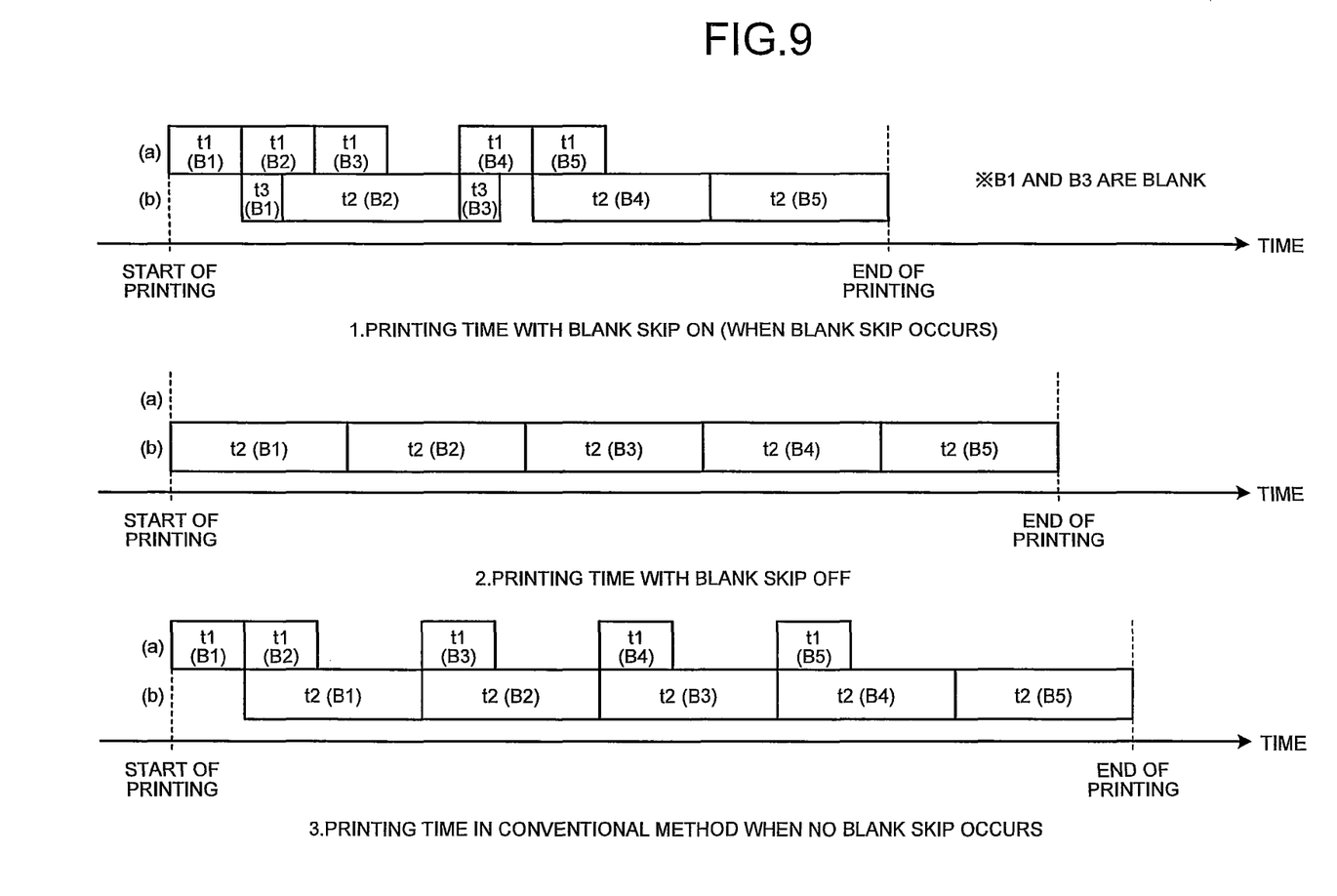
FIG. 9 shows a view explaining the printing time for one page.

FIG. 9 is a view illustrating the time for printing one page. FIG. 9 shows an example where regions capable of recording received image of two bands on the RAM 505 are provided. However, the size of the recordable region is not limited thereto.

FIG. 9-1 illustrates the printing time when a blank skip occurs with the blank skip function ON according to the present invention. FIG. 9-2 illustrates the printing time when the blank skip function is OFF according to the present invention. FIG. 9-3 illustrates the printing time in a conventional method when no blank skip occurs.

The symbols B1, B2, . . . , and B5 in FIG. 9 shows band numbers, and FIG. 9 illustrates an example in which printing of an image of five bands is performed. The processing time in the processing flowchart of FIG. 6(a) or FIG. 8(a) is shown at (a) in FIG. 9, and the processing time in the processing flowchart of FIG. 6(b) or FIG. 8(b) is shown at (b) in FIG. 9.

In the processing flowchart of FIGS. 6(a) and 8(a), let t1 be the time from the reception of an image of one band until the result of detection is informed. In the processing flowchart of FIGS. 6(b) and 8(b), let t2 be the time from the processing of an image of one band until the image is printed. In the processing flowchart of FIGS. 6(b) and 8(b), let t3 be the time required to discard image data and to feed the sheet for one band.

FIGS. 9-1 and 9-2 refer to the processing flowchart of FIG. 8, and FIG. 9-3 refers to the processing flowchart of FIG. 6.

In particular, an example of times t1 to t3 will be shown below for a large image forming apparatus configured to perform processing of sheet sizes up to the width of A0. In the high-speed mode, t1=about 1000 [ms], t2=about 2000

[ms], and t3=about 300 [ms]. In the high-quality image mode, t1=about 1000 [ms], t2=about 16000 [ms], and t3=about 1500 [ms].

FIG. 9-1 illustrates an example where the blank skip function is ON and two bands of blank skip have occurred. Since the processing flow of FIG. 8(b) starts with a delay corresponding to one band with respect to the processing flow of FIG. 8(a), the processing flow of FIG. 8(b) starts after time t1 has elapsed from the start of printing one page. Depending on when a blank skip occurs, a wait time may occur between the processing flow of FIG. 8(a) and the processing flow of FIG. 8(b). Thus, the printing time of one page cannot be uniquely represented. However, the printing time is shorter than in the case where no blank skip occurs.

FIG. 9-2 illustrates an example where the blank skip function is OFF. Since the blank skip function is OFF, the skip detection of one band is eliminated and no wait time for one band occurs, and the processing and output of the image are started in the processing flow of FIG. 8(b). The printing time of one page is time t2×the number of bands.

FIG. 9-3 illustrates an example of a conventional method where no blank skip occurs. Since the processing flow of FIG. 6(b) starts with a delay corresponding to one band with respect to the processing flow of FIG. 6(a), the processing flow of FIG. 6(b) starts after time t1 has elapsed from the start of printing one page. Thus, the printing time of one page is time t1+time t2×the number of bands.

That is, the present invention can be carried out without increasing the printing time for one page when no blank skip occurs as compared to a conventional method.

Figure 10:
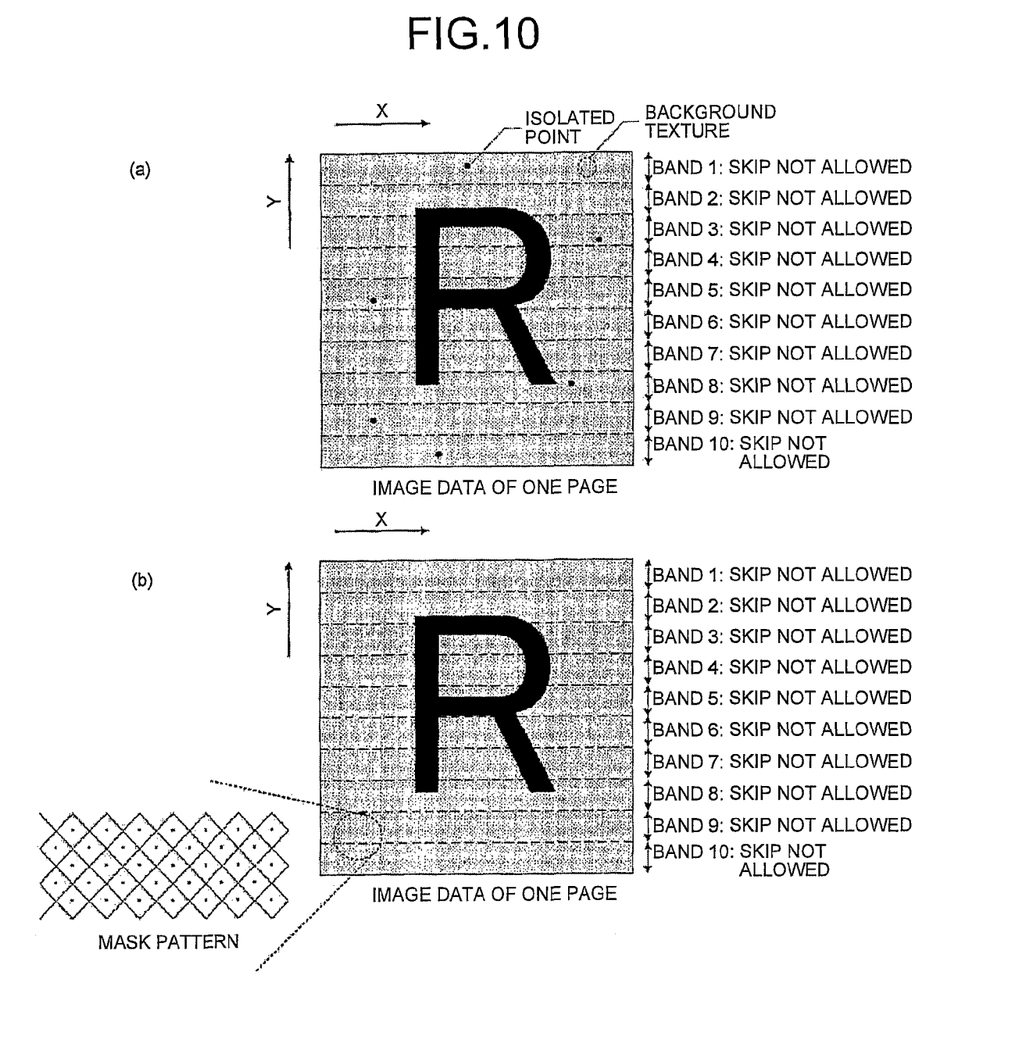
FIG. 10 shows image data in a copy printing mode and a security printing mode.

FIG. 10(a) illustrates image data supplied to the printer image processing unit 408 in the copy printing mode. In the copy mode, the scanner unit 401 reads a document and records the resulting image data. Even when a blank of one band or more exists in the document, the resulting image data has background data of low concentration called "Jihada (background texture)" or image noise called "an isolated point" that is minute and meaningless as an image. Thus, no blank band exists and no blank skip action is taken.

Thus, as shown in FIG. 7, the copy printing mode and the printer printing mode may be provided with the respective blank skip ON/OFF setting values so as to perform switching. The initial ON/OFF setting value is ON for the printer printing mode and OFF for the copy printing mode, thereby avoiding an increase in the printing time during the copy printing.

FIG. 10(b) illustrates image data supplied to the printer image processing unit 408 in the security printing mode of the printer printing mode. The security printing mode is part of the printer printing mode in which when a user has selected the security printing mode, a particular mask pattern is combined in the background of an image.

The purpose of the security printing mode is to prevent a printed matter from being copied. When copy-printing is performed using the printed matter with a mask pattern printed as a document, the image forming apparatus reads a combined mask pattern, and does not perform copying, paints out the resulting printed copy, performs output while combining the characters for conveying the message for imposing a ban on copying. In this manner, the security function is enhanced.

When the security printing mode is employed, since the image data supplied to the printer image processing unit 408 is combined with a mask pattern, there exists no blank band, and no blank skip action is taken.

Thus, as shown in FIG. 7, the security printing mode and another printing mode may be provided with the respective blank skip ON/OFF setting values so as to perform switching. The initial ON/OFF setting value is OFF for the security printing mode and ON for the another printing mode, thereby avoiding an increase in the printing time during the security printing.

The present embodiment makes it possible to reduce printing time in a printing mode in which there is a high probability of no blank band existing in image data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a processor configured to initiate a process for analyzing a segment of image data responsive to a determination that the image forming apparatus is in a first printing mode, wherein during the process the processor is configured to:
store the segment of the image data that corresponds to a length of a recording medium in a sub-scanning direction that is smaller than a page of the recording medium;
analyze the segment of the image data that corresponds to the length of the recording medium in the sub-scanning direction that is smaller than the page of the recording medium;
determine whether the segment is blank space; and
convey the recording medium for the length corresponding to the segment to form the blank space on the recording medium responsive to a determination that the segment is blank space;
the processor configured, in response to a determination that the image forming apparatus is in a second printing mode, to bypass the process for analyzing the segment of the image data, and direct image formation based on the image data.

2. The image forming apparatus according to claim 1, wherein the second printing mode is a copy printing mode.

3. The image forming apparatus according to claim 1, wherein the second printing mode is a security printing mode.

4. An image forming method comprising:
initiating a process for analyzing a segment of image data responsive to a determination that an image forming apparatus is in a first printing mode, the process comprising:
storing the segment of the image data that corresponds to a length of a recording medium in a sub-scanning direction that is smaller than a page of the recording medium;
analyzing the segment of the image data that corresponds to the length of the recording medium in the sub-scanning direction that is smaller than the page of the recording medium;
determining whether the segment is blank space; and
conveying the recording medium for the length corresponding to the segment to form the blank space on the recording medium responsive to a determination that the segment is blank space; and
in response to a determination that the image forming apparatus is in a second printing mode:
bypassing the process for analyzing the segment of the image data; and
directing image formation based on the image data.

5. An image forming apparatus comprising:
a processor configured to initiate a process for analyzing a segment of image data responsive to a determination that the image forming apparatus is in a mode in which externally input data is printed, wherein during the process the processor is configured to:
   store the segment of the image data that corresponds to a length of a recording medium in a sub-scanning direction that is smaller than a page of the recording medium;
   analyze the segment of the image data that corresponds to the length of the recording medium in the sub-scanning direction that is smaller than the page of the recording medium;
   determine whether the segment is blank space; and
   convey the recording medium for the length corresponding to the segment to form the blank space on the recording medium responsive to a determination that the segment is blank space;
the processor configured, in response to a determination that the image forming apparatus is in a copy mode in which data read by a scanner is printed, to: bypass the process for analyzing the segment of the image data, and direct image formation based on the image data.

* * * * *